Nov. 29, 1932.  E. T. MARTIN  1,889,485
WATER PURIFIER AND SOFTENER
Filed Dec. 25, 1930  2 Sheets-Sheet 1
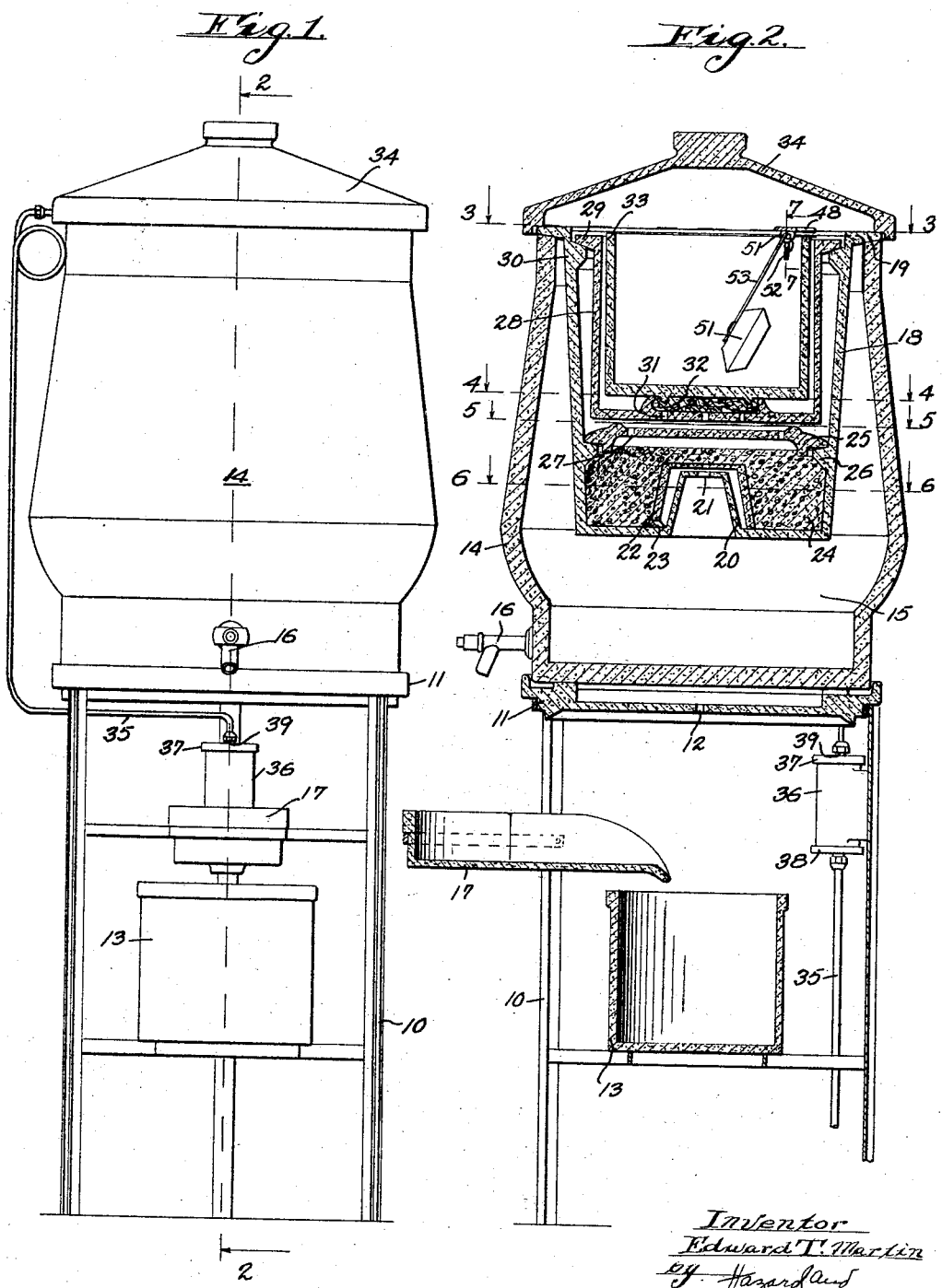

Nov. 29, 1932.  E. T. MARTIN  1,889,485
WATER PURIFIER AND SOFTENER
Filed Dec. 25, 1930  2 Sheets-Sheet 2
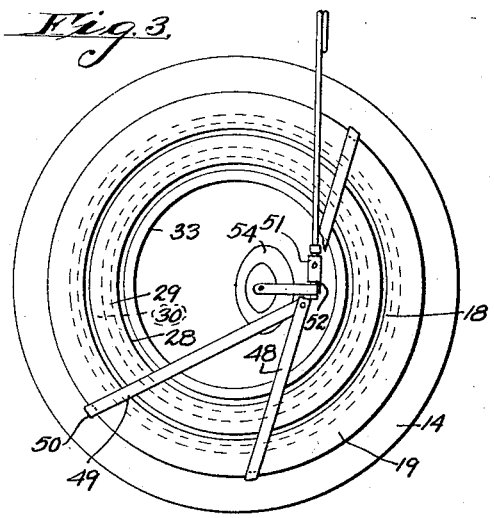
Fig. 3.
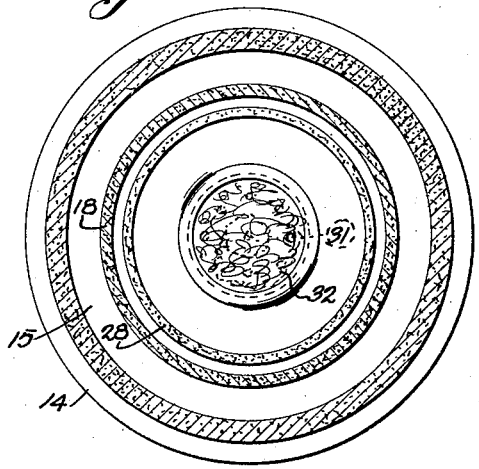
Fig. 4.
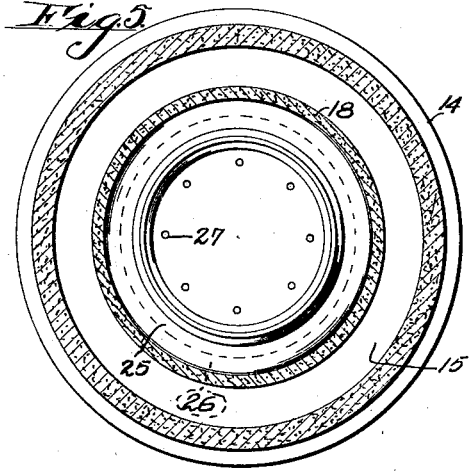
Fig. 5.
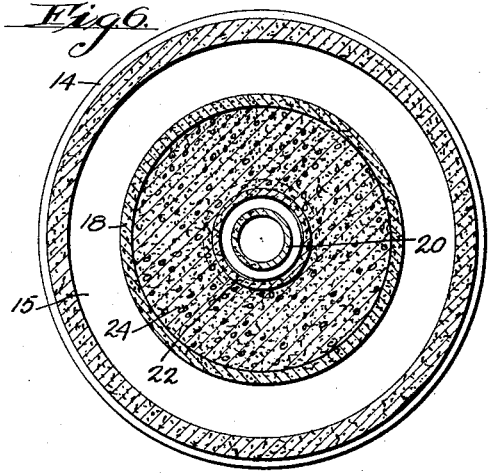
Fig. 6.
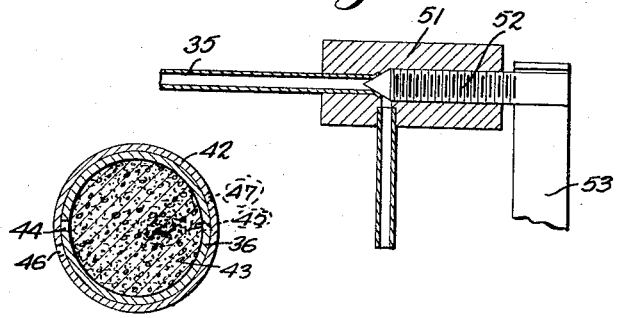
Fig. 7.
Fig. 9.
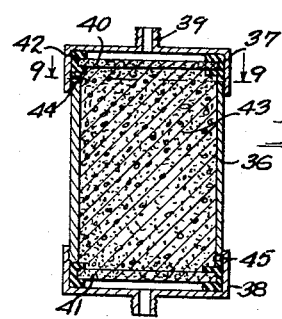
Fig. 8.
Inventor
Edward T. Martin
by Hazard and Miller
Attorneys Patented Nov. 29, 1932

1,889,485

UNITED STATES PATENT OFFICE

EDWARD T. MARTIN, OF LONG BEACH, CALIFORNIA, ASSIGNOR TO C. E. CHENOWETH, OF GLENDALE, E. T. MARTIN, OF LONG BEACH, AND GUIDO J. WIGGENHORN, OF SOUTH PASADENA, CALIFORNIA, AS TRUSTEES

WATER PURIFIER AND SOFTENER

Application filed December 25, 1930. Serial No. 504,663.

This invention relates to a water purifier and softener. Heretofore quite a number of various types of water percolators have been designed in which there is a receiver jar in which water is initially received and a filtering means through which the water passes from the receiver jar into an olla, the walls of the olla usually having sufficient porosity to enable the water to pass therethrough in such a manner as to keep the exterior surfaces of the olla moist to cool the water within the olla. The success of this type of water percolator on the market has been considerably hampered due to the fact that the users of the percolator are usually negligent in keeping the receiver jar filled with water. Instead they frequently allow the level of water within the receiver jar to fall and consequently the level of water within the olla, constituting the storage reservoir, to be so lowered that only a small portion of the walls of the olla will be kept moist by the water with the consequence that there is insufficient evaporation to keep the water within the olla cool.

It is an object of this invention to provide an improved form of water percolator of the above mentioned type wherein there is a constant source of supply for supplying water to the receiver jar and a float operated valve controlling its discharge into the receiver jar. In this manner the level of water within the receiver jar will be automatically maintained at a predetermined height so that the filtered or purified water within the olla will likewise be kept at a sufficient height to maintain a maximum evaporation taking place on the exterior of the olla.

It is another object of this invention to provide a water percolator as above described wherein the supply pipe leading to the receiver jar has incorporated in it a suitable water softening device which is of novel construction serving to soften the water prior to its introduction into the receiver jar and enabling the water softening device to be readily and easily cleaned from time to time.

With the foregoing and other objects in view, which will be made manifest in the following detailed description, and specifically pointed out in the appended claims, reference is had to the accompanying drawings for an illustrative embodiment of the invention, wherein:

Fig. 1 is a front view in elevation of the improved water percolator.

Fig. 2 is a sectional view taken substantially upon the line 2—2 upon Fig. 1 in the direction indicated.

Fig. 3 is a horizontal section taken substantially upon the line 3—3 upon Fig. 2.

Fig. 4 is a horizontal section taken substantially upon the line 4—4 upon Fig. 2.

Fig. 5 is a horizontal section taken upon the line 5—5 upon Fig. 2.

Fig. 6 is a horizontal section taken upon the line 6—6 upon Fig. 2.

Fig. 7 is a vertical section taken upon the line 7—7 upon Fig. 2.

Fig. 8 is a vertical section through the water softening device incorporated in the supply pipe.

Fig. 9 is a horizontal section taken upon the line 9—9 upon Fig. 8.

Referring to the accompanying drawings, wherein similar reference characters designate similar parts throughout, the water percolator, to which the invention is illustrated as having been applied, is shown as consisting of a suitable stand 10 on which there is positioned a supporting plate 11 having a central aperture 12 adapted to discharge any water which may drain onto the supporting plate into a waste receptacle 13 supported on the stand 10 beneath the supporting plate 11. An olla 14 rests on the supporting plate and has the usual porous walls permitting water contained within the storage reservoir 15 provided thereby to slowly filter or seep therethrough to be evaporated on its exterior. This olla has near its bottom a discharge faucet 16 through which water within the storage reservoir 15 can be withdrawn. The conventional spout 17 is mounted on the stand beneath the faucet 16 to catch any dripping from the faucet 16 and discharge it into the waste receptacle 13.

A filtering means is supported within the olla comprising an outer jar 18 having an outwardly extending lip 19 resting on top of the olla and having a raised portion 20 formed centrally of its bottom. An aperture or apertures 21 are formed in the raised central portion and the raised central portion is covered by an inverted cup 22 in the bottom edge of which there are formed a plurality of recesses 23. The inverted cup is surrounded by a suitable filtering material indicated at 24, preferably carbonaceous in character, and for this purpose I prefer to employ a material commonly sold on the market under the name of "Charbon". A plate 25 is disposed over the filtering material 24 and rests on an inwardly extending flange 26 on the interior of the outer jar 18. This plate has a raised annular bead near its edge within which apertures 27 are formed. An inner jar 28 has at its top an outwardly extending flange 29 by which it may be suspended on a flange 30 formed on the interior of the outer jar 18. This inner jar has a perforated central portion in its bottom as indicated at 31 over which there is formed a pocket to receive an asbestos filtering pad 32. A receiver jar 33 formed of a quite porous material such as that generally known to the trade as "Argon" rests within the inner jar 32. A suitable cover 34 rests on top of flange 19 on the outer jar and serves to cover all of the jars and the olla.

The invention resides in leading a supply pipe 35 from a suitable water supply to the percolator, which supply pipe may have incorporated in it a water softening device. This water softening device consists of a cylindrical body 36 having threaded ends to receive threaded end caps 37 and 38. The end caps are provided with suitable nipples 39 providing for attachment and incorporation in the supply pipe. Porous plates 40 and 41 fit within the end caps. Rubber rings or gaskets 42 are provided for them which have interior annular grooves. The edges of the porous plates 40 and 41 fit within the grooves and the rings are applied to the porous plates by stretching them over the edges of the plates and allowing the rings to contract onto the plates. These porous plates diffuse the water passing therethrough so that the water will be evenly flowing throughout the water softening material 43. Between the porous plates 40 and 41 there is disposed a suitable water softener 43 which may be a material sold to the trade under the name of "Doucil". Any equivalent water softener such as natural or artificial zeolites may be used to accomplish this purpose. In the ends of the body 36 there are formed apertures 44 and 45 and corresponding apertures 46 and 47 are formed in the sides of the end caps 37 and 38. The apertures 46 and 47 are normally out of registration with apertures 44 and 45, as shown in Figures 9. However, on turning the end caps slightly these apertures can be caused to register and a hot saline solution or equivalent reconditioning solution may be poured through apertures 46 and 44 and withdrawn through apertures 45 and 47, reconditioning the water softening material 43. This reconditioning of the water softening device is usually done at predetermined intervals and after the water softening material 43 has been thus reconditioned the end caps are turned so as to close apertures 44 and 45.

From the top of the water softening device the supply pipe 35 leads to the top of the water percolator and passes through a small notch formed in the cover 34 to the top of the receiver jar 33. A bracket 48 is provided having downwardly bent ends which are spaced from each other a distance somewhat less than the diameter across the top of the olla 14, as shown in Figure 3. Adjacent the center of this bracket there is pivotally mounted an arm 49 having a downwardly bent end as indicated at 50. The bracket 48 is slipped over the tops of the jars 18, 28 and 33, and is forced laterally until its downwardly bent ends engage the sides of lip or flange 19 on jar 18. Arm 49 is then swung until its downwardly bent end 50 engages the side of lip 19 to maintain the bracket 48 in applied position. Near the center of the bracket there is mounted a valve, the body of which is indicated at 51 with the supply pipe 35 leading thereto. This body is internally threaded to receive a needle valve 52, which carries an arm 53 on which a float 54 is mounted. The supply pipe 35, valve body 51, needle valve 52, arm 53 and float 54, are all preferably formed of a non-corrodible material. As the float 54 rises in the receiver jar 33, it causes the arm 53 to rotate the needle valve 52 and screw the needle valve 52 down against its seat to close the valve. Conversely as the level of water within the receiver jar 33 falls, the needle valve 52 will be reversely rotated to open the needle valve.

From the above described construction it will be readily appreciated that the supply pipe 35 continuously supplies water to the receiver jar 33 as needed and as the water is caused to pass through the water softening material 43 prior to delivery to the receiver jar, it will be adequately softened before entering the percolator. The float operated valve in the receiver jar automatically causes the level of the water within the receiver jar 33 to be maintained at a predetermined height, that is nearly full. The water in the receiver jar percolates through its walls and then passes through the asbestos pad 32, through the perforated bottom 31 in the inner jar, and is collected within the annular bead or plate 25. As the apertures 27 are arranged near the bead, the water passing through them will be discharged at about the center of the annular mass of filtering material 24. It is caused to filter through the filtering material and enter the inverted cup 32 through recesses 23, from which it may pass through aperture 21 into the storage reservoir 15. The water will be caused to continuously pass through this filter construction until the level of water within the olla reaches the predetermined level of water within the receiver jar and as the level of water within the receiver jar 33 is maintained at a constant height and near the top of the jar, the olla will be kept constantly filled. In this manner evaporation of the water which seeps through the pores in the walls of the olla will be caused to take place over substantially the entire exterior of the olla with the result that the water within the storage reservoir 15 will be kept fresh and cool. It will be readily appreciated that the improved construction will not permit the level of water within the olla to fall as in prior constructions, with the result that insufficient evaporation takes place to keep the water cool and fresh.

Whenever it is desired to replace the asbestos pad 32 or the filtering material 24, or to clean the jars of the filtering construction, the brackets 48 with its float operated valve can be easily removed. This is accomplished by swinging the arm 49 so that its downwardly bent end 50 disengages lip or flange 19 on jar 18, permitting the bracket to slide laterally with respect to the lip 19 until it is loosened and can be removed. As the upper end of the supply pipe is preferably formed of bendable tubing, the bracket can be removed sufficiently to permit withdrawal of all of the jars within the olla.

Various changes may be made in the details of construction without departing from the spirit or scope of the invention as defined by the appended claims.

I claim:

1. In combination with a water percolator having an olla, a receiver jar disposed within the olla, filtering means through which water must pass from the receiver jar to the storage reservoir provided by the olla, means for supplying the receiver jar with water, means for causing the water level in the receiver jar to be maintained at a predetermined height, the last mentioned means being supported upon the top of the receiver jar and being removable, and a cover for the olla covering over the receiver jar and the last mentioned means.

2. In combination with a water percolator having an olla, a receiver jar disposed within the olla, a filtering means through which water must pass from the receiver jar to the storage reservoir provided by the olla, means supplying the receiver jar with water, a float operated valve for causing the water level to be maintained in the receiver jar at a predetermined height, said float operated valve being removably supported upon the top of the receiver jar, and a cover for the olla covering over the receiver jar and the float operated valve therein.

3. In combination with an olla, a supply pipe for delivering water to the olla, a jar therein, a bracket having downwardly extending ends spaced at less than the length of the diameter of the mouth of the olla, an arm pivoted to the bracket having a downwardly extending end adapted to engage said jar to maintain the bracket in applied position, and a float operated valve to which the supply pipe is connected suspended by the bracket in the mouth of the olla.

4. In combination with a water percolator having an olla, a receiver jar disposed within the olla, filtering means through which water must pass from the receiver jar to the storage reservoir provided by the olla, a supply pipe for delivering water to the olla, a bracket having downwardly extending ends spaced at less than the length of the diameter of the mouth of the olla, an arm pivoted to the bracket having a downwardly extending end adapted to engage said jar to maintain the bracket in applied position, and a float operated valve to which the supply pipe is connected suspended by the bracket within the receiver jar.

In testimony whereof I have signed my name to this specification.

EDWARD T. MARTIN.